United States Patent
Shin et al.

(10) Patent No.: US 11,828,360 B2
(45) Date of Patent: Nov. 28, 2023

(54) APPARATUS FOR CONTROLLING A TRANSMISSION OF A VEHICLE AND A METHOD THEREOF

(71) Applicants: HYUNDAI MOTOR COMPANY, Seoul (KR); KIA CORPORATION, Seoul (KR)

(72) Inventors: Yong Uk Shin, Seongnam-si (KR); Byeong Wook Jeon, Seoul (KR); Dong Hoon Jeong, Hwaseong-si (KR); Min Jae Chai, Gwangmyeong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 22 days.

(21) Appl. No.: 17/830,092

(22) Filed: Jun. 1, 2022

(65) Prior Publication Data
US 2022/0397192 A1    Dec. 15, 2022

(30) Foreign Application Priority Data
Jun. 11, 2021    (KR) .................. 10-2021-0076184

(51) Int. Cl.
| | |
|---|---|
| *F16H 61/02* | (2006.01) |
| *F16H 59/36* | (2006.01) |
| *F16H 59/66* | (2006.01) |
| *F16H 59/70* | (2006.01) |
| *F16H 59/18* | (2006.01) |
| *F16H 59/54* | (2006.01) |
| *F16H 61/00* | (2006.01) |

(52) U.S. Cl.
CPC ......... *F16H 61/0213* (2013.01); *F16H 59/18* (2013.01); *F16H 59/36* (2013.01); *F16H 59/54* (2013.01); *F16H 59/66* (2013.01); *F16H 59/70* (2013.01); *F16H 2059/366* (2013.01); *F16H 2059/663* (2013.01); *F16H 2061/0087* (2013.01)

(58) Field of Classification Search
CPC .......... F16H 59/18; F16H 59/36; F16H 59/54; F16H 59/66; F16H 59/70; F16H 2059/366; F16H 2059/663; F16H 61/0213; F16H 2061/0087
See application file for complete search history.

(56) References Cited

U.S. PATENT DOCUMENTS

| | | | |
|---|---|---|---|
| 11,441,916 B1 * | 9/2022 | Konrardy | H04W 4/40 |
| 2020/0272705 A1 * | 8/2020 | Rakuff | G06N 20/00 |
| 2021/0190204 A1 * | 6/2021 | Hashimoto | G06N 20/00 |

* cited by examiner

*Primary Examiner* — Edwin A Young
(74) *Attorney, Agent, or Firm* — LEMPIA SUMMERFIELD KATZ LLC

(57) ABSTRACT

An apparatus and a method for controlling a transmission of a vehicle include an agent that determines a gear stage of the vehicle based on driving information of the vehicle, shape information of a road, and/or operation information of a driver, and include a controller that performs a reward with respect to the determination of the agent and controls the transmission of the vehicle based on the gear stage determined by the agent.

18 Claims, 6 Drawing Sheets

APPARATUS FOR CONTROLLING A TRANSMISSION OF A VEHICLE AND A METHOD THEREOF

CROSS-REFERENCE TO RELATED APPLICATION

This application claims the benefit of priority to Korean Patent Application No. 10-2021-0076184, filed in the Korean Intellectual Property Office on Jun. 11, 2021, the entire contents of which are incorporated herein by reference.

TECHNICAL FIELD

The present disclosure relates to a technique for determining an optimal gear stage using an agent based on reinforcement learning.

BACKGROUND

In general, vehicles are provided with a transmission to control a driving speed of a vehicle by using power of an engine. Such a transmission may be a manual transmission that is controlled by a driver and an automatic transmission that is automatically controlled depending on the driving speed of the vehicle. The automatic transmission is installed between an axle and an output shaft of an internal combustion engine of a vehicle. The automatic transmission automatically adjusts a transmission ratio depending on an operating amount of an accelerator or a driving speed of the vehicle.

The conventional technology for controlling a transmission of the vehicle controls the transmission based on a shift pattern corresponding to a vehicle speed and an amount of an operation or actuation of an accelerator pedal (determined by an accelerator position sensor (APS) value). In this case, to prevent a busy shift phenomenon (i.e., repeatedly shifting between two gear stages), an upshift pattern used for raising a gear stage and a downshift pattern used for lowering the gear stage are separately provided.

When this conventional technique is applied to a six-speed transmission as an example, a basic shift pattern (composed of 5 upshift patterns and 5 downshift patterns) should be provided. Further, dozens of shift patterns should be additionally provided depending on driving conditions (e.g., a slope, an altitude, a driving mode, and the like.).

Accordingly, since the conventional art requires hundreds of upshift and downshift patterns, a lot of test or experimentation time is required, and it is difficult to implement the shift control logic.

Descriptions in this background section are provided to enhance understanding of the background of the disclosure. Thus, the background section may include descriptions other than those of the prior art or already known to those having ordinary skill in the art to which this technology belongs.

SUMMARY

The present disclosure has been made to solve the above-mentioned problems occurring in the prior art while having advantages achieved by the prior art maintained intact.

An aspect of the present disclosure is to provide a transmission control apparatus and method of a vehicle capable of determining an optimal gear stage in which both the driving environment of the vehicle and the road environment, as well as the driving tendency of a driver, are reflected, to solve the problems of the prior art as described above. The transmission control apparatus and method of a vehicle determine the optimal gear stage by performing reinforcement learning to give a reward with respect to the determination of an agent, and by controlling the transmission of the vehicle based on the gear stage determined by the agent. The agent determines the gear stage of the vehicle based on driving information of the vehicle, shape information of a road, and operation information of the driver.

The technical problems to be solved by the present disclosure are not limited to the aforementioned problems Any other technical problems not mentioned herein should be clearly understood from the following description by those having ordinary skill in the art to which the present disclosure pertains. In addition, it should be easily understood that the objects and advantages of the disclosure are realized by means and combinations described in the appended claims.

According to an aspect of the present disclosure, a transmission control apparatus of a vehicle includes an agent that determines a gear stage of the vehicle based on driving information of the vehicle, shape information of a road, and operation information of a driver. The transmission control apparatus further includes a controller that performs a reward with respect to the determination of the agent and controls the transmission of the vehicle based on the gear stage determined by the agent.

According to an embodiment, the agent may perform reinforcement learning to receive a maximum reward from the controller.

According to an embodiment, the driving information of the vehicle may include at least one of a vehicle speed, a revolutions per minute (RPM) of an engine, and a current gear stage. The shape information of the road may include at least one of a slope of the road and/or a curvature of the road. The operation information of the driver may include at least one of an accelerator position sensor (APS) value and/or a brake position sensor (BPS) value.

According to an embodiment, the controller may perform the reward with respect to the determination of the agent based on at least one of a fuel consumption amount, an APS value, a BPS value, and/or an engine RPM of the vehicle.

According to an embodiment, the controller may determine a reward value with respect to at least one of a fuel consumption amount, an APS value, a BPS value, and/or an engine RPM of the vehicle. The controller may also assign different weights to the respective reward values and may determine a sum of the reward values to which the weights are applied as a final reward value.

According to an embodiment, the controller may set a lower reward value as the fuel consumption amount of the vehicle increases and may set a higher reward value as the fuel consumption amount decreases according to the gear stage determination of the agent.

According to an embodiment, the controller may set a higher reward value as an accumulative value of the APS value decreases and may set a lower reward value as the accumulative value of the APS value increases according to the gear stage determination of the agent.

According to an embodiment, the controller may set a higher reward value as an accumulative value of the BPS value decreases and may set a lower reward value as the accumulative value of the BPS value increases according to the gear stage determination of the agent.

According to an embodiment, the controller may set a higher reward value as an accumulative value of the engine RPM value decreases and may set a lower reward value as the accumulative value of the engine RPM value increases according to the gear stage determination of the agent.

According to an aspect of the present disclosure, a transmission control method of a vehicle includes determining, by an agent, a gear stage of the vehicle based on driving information of the vehicle, shape information of a road, and operation information of a driver. The transmission control method of a vehicle further includes performing, by a controller, a reward with respect to the determination of the agent, and controlling, by the controller, a transmission of the vehicle based on the gear stage determined by the agent.

According to an embodiment, the determining of the gear stage of the vehicle may include performing reinforcement learning to receive a maximum reward from the controller.

According to an embodiment, the determining of the gear stage of the vehicle may include obtaining at least one of a vehicle speed, an engine RPM, and/or a current gear stage, as driving information of the vehicle. The determining of the gear stage of the vehicle also includes obtaining at least one of a slope of the road and/or a curvature of the road, as the shape information of the road. Furthermore, the determining of the gear stage of the vehicle includes obtaining at least one of an APS value and/or a BPS value as the operation information of the driver.

According to an embodiment, the performing the reward with respect to the determination of the agent may include performing the reward with respect to the determination of the agent based on at least one of a fuel consumption amount, an APS value, a BPS value, and/or an engine RPM of the vehicle.

According to an embodiment, the performing the reward with respect to the determination of the agent may include determining a reward value with respect to at least one of a fuel consumption amount, an APS value, a BPS value, and/or an engine RPM of the vehicle. The performing the reward may further include assigning different weights to the respective reward values and determining a sum of the reward values to which the weights are applied as a final reward value.

According to an embodiment, the performing the reward with respect to the determination of the agent may include setting a lower reward value as the fuel consumption amount of the vehicle increases according to the gear stage determination of the agent and may include setting a higher reward value as the fuel consumption amount decreases.

According to an embodiment, the performing the reward with respect to the determination of the agent may include setting a higher reward value as an accumulative value of the APS value decreases according to the gear stage determination of the agent. The performing the reward may further include setting a lower reward value as the accumulative value of the APS value increases.

According to an embodiment, the performing the reward with respect to the determination of the agent may include setting a higher reward value as an accumulative value of the BPS value decreases according to the gear stage determination of the agent and may include setting a lower reward value as the accumulative value of the BPS value increases.

According to an embodiment, the performing the reward with respect to the determination of the agent may include setting a higher reward value as an accumulative value of the engine RPM value decreases according to the gear stage determination of the agent and may include setting a lower reward value as the accumulative value of the engine RPM value increases.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
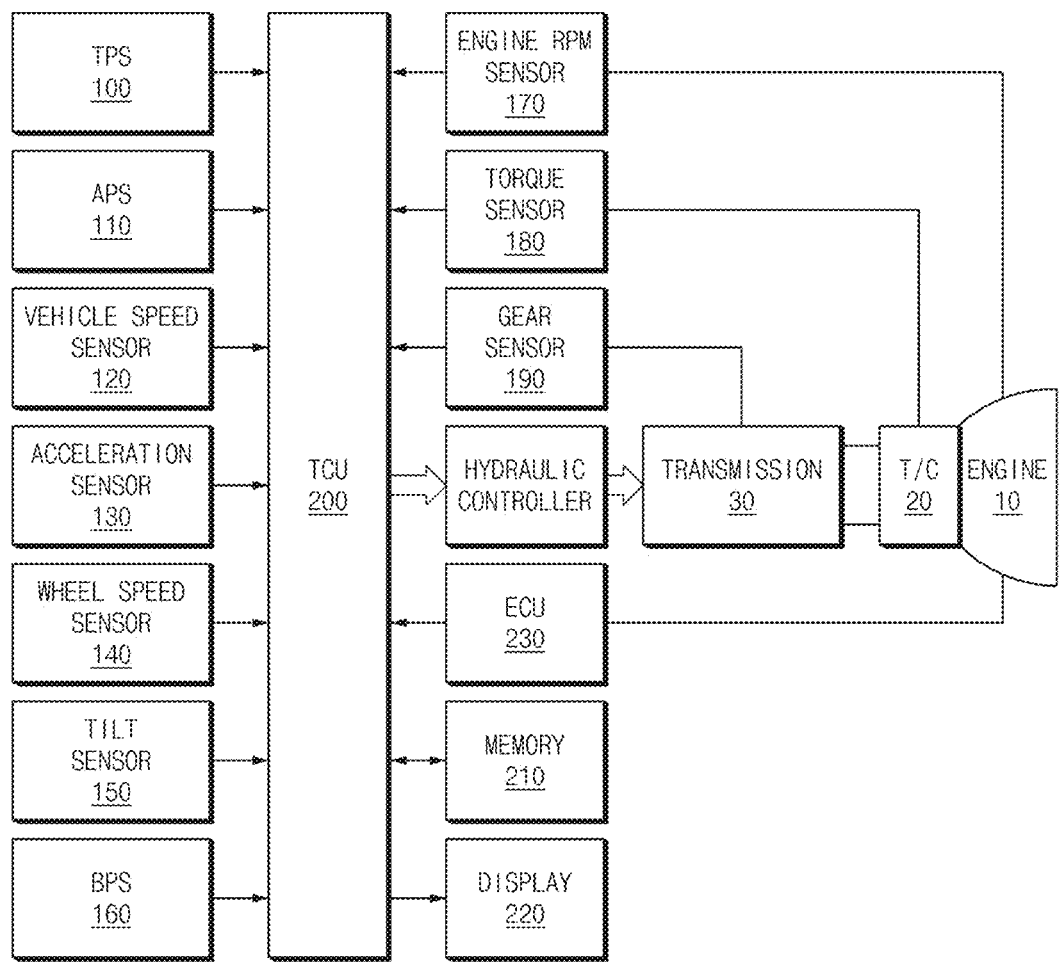
FIG. 1 is a diagram illustrating a transmission control system of a vehicle to which the present disclosure is applied.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function has been omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components. The terms do not limit the nature, order, or sequence of the components. Unless otherwise defined, all terms, including technical and scientific terms used herein, have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art. Such terms should not be interpreted in an idealized or overly formal sense unless expressly so defined herein.

When a component, device, element, or the like of the present disclosure is described as having a purpose or performing an operation, function, or the like, the component, device, or element should be considered herein as being "configured to" meet that purpose or to perform that operation or function.

FIG. 1 is a diagram illustrating a transmission control system of a vehicle to which the present disclosure is applied. FIG. 1 indicates the case where a power source is an engine 10, but it should be apparent that the same manner may be applied to the case where the power source is a motor.

As illustrated in FIG. 1, a transmission control system of a vehicle to which the present disclosure is applied may include: a throttle position sensor (TPS) 100; an accelerator position sensor (APS) 110; a vehicle speed sensor 120; an acceleration sensor 130; a wheel speed sensor 140; a tilt sensor 150; a brake position sensor (BPS) 160; an engine revolution per minute (RPM) sensor 170; a torque sensor 180; a gear sensor 190; a transmission control unit (TCU) 200; a memory 210; a display 220; and an engine control unit (ECU) 230.

Referring to each of the above components, first, the TPS 100 may sense a throttle position according to an opening degree of a throttle valve of the engine 10. The TPS 100 may generate a throttle position sensing signal as a result of the sensing. The APS 110 may sense an accelerator position according to a driver's operational state of an accelerator pedal and may generate an accelerator position sensing signal accordingly. The vehicle speed sensor 120 may sense a vehicle speed according to the driving of the vehicle and may generate a vehicle speed sensing signal accordingly. The acceleration sensor 130 may sense a change in a longitudinal acceleration according to the driving of the vehicle and may generate a longitudinal acceleration sensing signal accordingly. Furthermore, the acceleration sensor 130 may sense a change in a lateral acceleration according to the driving of the vehicle and may generate a lateral acceleration sensing signal accordingly. The wheel speed sensor 140 may sense a wheel speed according to the driving of the vehicle and may generate a wheel speed sensing signal accordingly. The tilt sensor 150 may sense a tilt of the vehicle body according to the driving of the vehicle on a slope (or a curved road) and may generate a tilt sensing signal accordingly. The BPS 160 may sense a driver's operational state of a brake pedal and may generate a brake position sensing signal accordingly. The engine RPM sensor 170 may sense an RPM according to the driving of the engine 10 and may generate an RPM sensing signal accordingly. The torque sensor 180 may sense a rotational torque of a torque converter 20 coupled between the engine 10 and a transmission 30 and may generate a torque sensing signal accordingly. The gear sensor 190 may sense a gear stage operation state according to a shift of the transmission 30 and may generate a gear stage sensing signal accordingly.

Meanwhile, to control the transmission of the vehicle, the TCU 200 may receive: the throttle position sensing signal from the TPS 100; the accelerator position sensing signal from the APS 110; the vehicle speed sensing signal from the vehicle speed sensor 120; the acceleration sensing signal from the acceleration sensor 130; the wheel speed sensing signal from the wheel speed sensor 140; the tilt sensing signal from the tilt sensor 150; the brake position sensing signal from the BPS 160; the RPM sensing signal from the engine RPM sensor 170; the torque sensing signal from the torque sensor 180; and the gear stage sensing signal from the gear sensor 190.

The TCU 200 may collect data to identify the road condition (slope, curvature, and the like) and the driving condition of the vehicle through the sensing signals from each of the sensors. The TCU 200 may also perform analysis and information classification with respect to the collected data. In this case, driving information data analyzed through the collected data may include: an opening degree of the throttle valve; a position of the accelerator; a current gear engagement state of the transmission; a vehicle speed; an acceleration; the engine RPM; an average vehicle speed; a wheel rotation speed difference; a vehicle tilt; an operating cycle of the brake; a torque demand of the engine; a curvature of a road; a slope of the road; and the like. The TCU 200 may perform a gear shift (Up/Down Shift) according to a preset shift pattern based on the analyzed driving information data. The memory 210 may store a shift pattern according to a manual shift command by a driver, a shift pattern according to a shift protection command, and a shift pattern of a class defined by shifting in a class mode. The memory 210 may also store driving information data corresponding to the shift pattern of the class. The display 220 may display a shift progress state by applying the current shift pattern according to a control of the TCU 200 such that the driver can recognize the shift progress state. The ECU 230 may calculate a fuel consumption amount of the engine 10.

The above-described transmission control system of the vehicle may control (general method) the transmission of the vehicle based on the shift pattern. In addition, when a method according to an embodiment of the present disclosure described below is applied, the transmission control system may control the transmission of the vehicle in a required power method, not the shift pattern.

Figure 2:
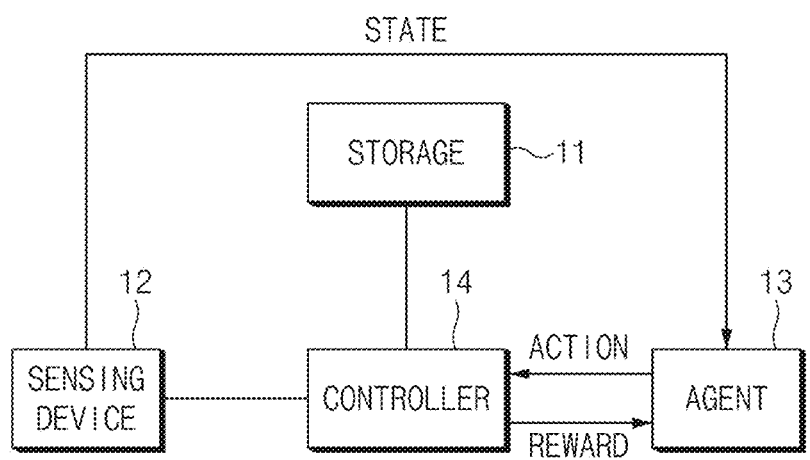
FIG. 2 is a diagram illustrating a configuration of a transmission control apparatus of a vehicle, according to an embodiment of the present disclosure.

FIG. 2 is a diagram illustrating a configuration of a transmission control apparatus of a vehicle, according to an embodiment of the present disclosure.

As illustrated in FIG. 2, a transmission control apparatus of a vehicle according to an embodiment of the present disclosure may include a storage 11, a sensing device 12, an agent 13, and a controller 14. In this case, according to a method of implementing the transmission control apparatus of a vehicle according to an embodiment of the present disclosure, each component may be combined with one another to be implemented as one, or one or more components may be omitted. In particular, a function of the agent 13 may be implemented to be performed by the controller 14.

Referring to each of the components, first, the storage 11 may store various logics, algorithms, and programs required in the process of performing a reinforcement learning to give a reward with respect to the determination of the agent 13 and in the process of controlling the transmission of the vehicle. The controlling the transmission of the vehicle is based on the gear stage determined by the agent 13, when the agent 13 determines the gear stage of the vehicle based on driving information of the vehicle, shape information of a road, and/or operation information of the driver.

The storage 11 may include at least one type of storage medium of a memory such as a flash memory type, a hard disk type, a micro type, and a card type (e.g., a Secure Digital Card, i.e., a SD card or an eXtream Digital Card, i.e., an XD card). The storage 11 may further include at least one type of storage medium of a memory such as a Random Access Memory (RAM), a Static RAM (SRAM), a Read-Only Memory, i.e., a ROM, a Programmable ROM, i.e., a PROM, an Electrically Erasable PROM, i.e., an EEPROM, a magnetic RAM, i.e., a MRAM, a magnetic disk, and an optical disk type memory.

The sensing device 12 may include the throttle position sensor (TPS) 100, the accelerator position sensor (APS) 110, the vehicle speed sensor 120, the acceleration sensor 130, the wheel speed sensor 140, the tilt sensor 150, the brake position sensor (BPS) 160, the engine revolution per minute (RPM) sensor 170, the torque sensor 180, the gear sensor 190, the transmission control unit (TCU) 200, the memory 210, the display 220, and the engine control unit (ECU) 230, as illustrated in FIG. 1.

The sensing device 12 may provide driving information of a vehicle, shape information of a road, and driver's operation information to the agent 13 as state information used for the reinforcement learning. In this case, the driving information of the vehicle may include the vehicle speed, the engine RPM, and the current gear stage. The shape information of the road may include the slope of the road and the curvature of the road. The driver's operation information may include the APS value and the BPS value.

The agent 13 is a computer program that establishes a policy for representing an action to be taken in a current state. The agent 13 may also determine the gear stage of the vehicle based on the state information provided from the sensing device 12. In other words, the agent 13 may determine the gear stage of the vehicle as an action.

The agent 13 performs the reinforcement learning with the goal of receiving the maximum reward from the controller 14.

The controller 14 may perform overall control such that each of the components may perform their functions normally. The controller 14 may be implemented in the form of hardware, may be implemented in the form of software, or may be implemented in the form of a combination of hardware and software. Preferably, the controller 14 may be implemented as a microprocessor, but is not limited thereto.

In particular, when the agent 13 determines the gear stage of the vehicle based on the driving information of the vehicle, the shape information of the road, and the driver's operation information, the controller 14 may perform the reinforcement learning to give a reward with respect to the determination of the agent 13. The controller 14 may further control the transmission of the vehicle based on the gear stage determined by the agent 13.

The controller 14 may detect the curvature of the road based on the sensing signal from the acceleration sensor 130 or may detect the slope of the road based on the sensing signal from the tilt sensor 150.

Hereinafter, a process in which the controller 14 performs the reward with respect to the determination of the agent 13 in the reinforcement learning process is described in detail.

The controller 14 may include at least one of a fuel consumption amount of the engine 10, an APS value, a BPS value, and/or an engine RPM, as a factor that sets the reward value given to the determination of the agent 13. The controller 14 may set the reward value by combining the at least one of the factors. In this case, the controller 14 may adjust the overall reward value by assigning different weights to each factor. As an example, the controller 14 may determine a reward value 'R' based on the following Equation 1.

$$R = a_1 \times A + a_2 \times B + a_3 \times C + a_4 \times D \qquad \text{[Equation 1]}$$

In this case, 'A' indicates the fuel consumption amount, 'B' indicates the APS value, 'C' indicates the BPS value, and 'D' indicates the engine RPM. In addition, '$a_1$' denotes a weight for the fuel consumption amount, '$a_2$' denotes a weight for the APS value, '$a_3$' denotes a weight for the BPS value, and '$a_4$' denotes a weight for the engine RPM.

A basic policy is as follows, in which the controller 14 sets the reward value for each of the fuel consumption amount of the engine 10, the APS value, the BPS value, and the engine RPM, according to the gear stage determination of the agent 13.

The controller 14 may set a lower reward value as the fuel consumption amount of the engine 10 increases and may set a higher reward value as the fuel consumption amount decreases. In this case, it may be understood that the meaning of the low (e.g., small) fuel consumption amount is to determine a more suitable gear stage than the case where the fuel consumption amount is high (e.g., large).

The controller 14 may set a higher reward value as the size of the APS value decreases and may set a lower reward value as the size of the APS value increases. In this case, when the APS value is large, it may be understood that the driver performs more manipulations than when the APS value is small.

The controller 14 may set a higher reward value as an accumulative value of the APS value (accumulated value during a reference time) decreases. The controller 14 may set a lower reward value as the accumulative value of the APS value increases. In this case, when the accumulative value of the APS value is large, it may be understood that the driver performs more manipulations than when the accumulative value of the APS value is small.

The controller 14 may set a higher reward value as a deviation of the APS value (deviation during a reference time) decreases and may set a lower reward value as the deviation of the APS value increases. In this case, when the deviation of the APS value is large, it may be understood that the driver performs more manipulations than when the deviation of the APS value is small.

The controller 14 may set a higher reward value as the size of the BPS value decreases and may set a lower reward value as the size of the BPS value increases. In this case, when the BPS value is large, it may be understood that the driver performs more manipulations than when the BPS value is small.

The controller 14 may set a higher reward value as an accumulative value of the BPS value (accumulative value during a reference time) decreases and may set a lower reward value as the accumulative value of the BPS value increases. In this case, when the accumulative value of the BPS value is large, it may be understood that the driver performs more manipulations than when the accumulative value of the BPS value is small.

The controller 14 may set a higher reward value as a deviation of the BPS value (deviation during a reference time) decreases and may set a lower reward value as the deviation of the BPS value increases. In this case, when the deviation of the BPS value is large, it may be understood that the driver performs more manipulations than when the deviation of the BPS value is small.

The controller 14 may set a higher reward value as the size of the engine RPM value decreases and may set a lower reward value as the size of the engine RPM value increases. In this case, when the engine RPM value is large, it may be understood that the driver performs more manipulations than when the engine RPM value is small.

The controller 14 may set a higher reward value as an accumulative value of the engine RPM value (accumulative value during a reference time) decreases and may set a lower reward value as the accumulative value of the engine RPM value increases. In this case, when the accumulative value of the engine RPM value is large, it may be understood that the driver performs more manipulations than when the accumulative value of the engine RPM value is small.

The controller 14 may set a higher reward value as a deviation of the engine RPM value (deviation during a reference time) decreases and may set a lower reward value as the deviation of the engine RPM value increases. In this case, when the deviation of the engine RPM value is large, it may be understood that the driver performs more manipulations than when the deviation of the engine RPM value is small.

In addition, the controller 14 may divide each entire range into a predetermined number of sections with respect to: the fuel consumption amount, the APS value, the BPS value, and the engine RPM. The controller 14 may determine a reference section (e.g., a section located in a middle) of the plurality of sections and may determine the reward value with respect to the fuel consumption amount, the APS value, the BPS value, and the engine's RPM. The controller 14 may determine the reward value by assigning a default value to the reference section and by assigning a value higher or lower than the default value to sections other than the reference section. In addition, when the reward value with respect to the fuel consumption amount, the APS value, the BPS value, and the engine RPM is determined, the controller 14 may assign different weights to each of the fuel consumption amount, the APS value, the BPS value, and the engine RPM to determine a final reward value.

Figure 3:
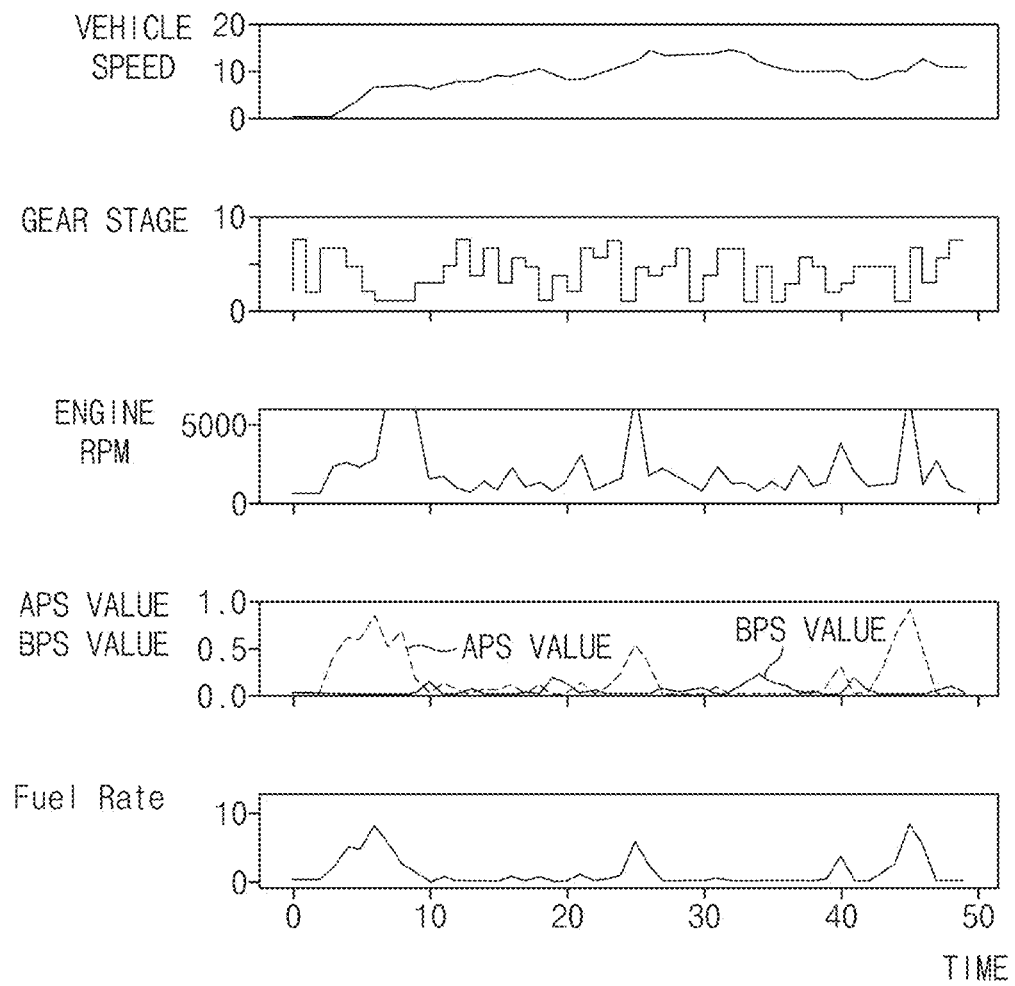
FIG. 3 is a diagram illustrating a performance of a transmission control apparatus of a vehicle, according to an embodiment of the present disclosure.

FIG. 3 is a diagram illustrating a performance of a transmission control apparatus of a vehicle, according to an embodiment of the present disclosure.

Figure 4:
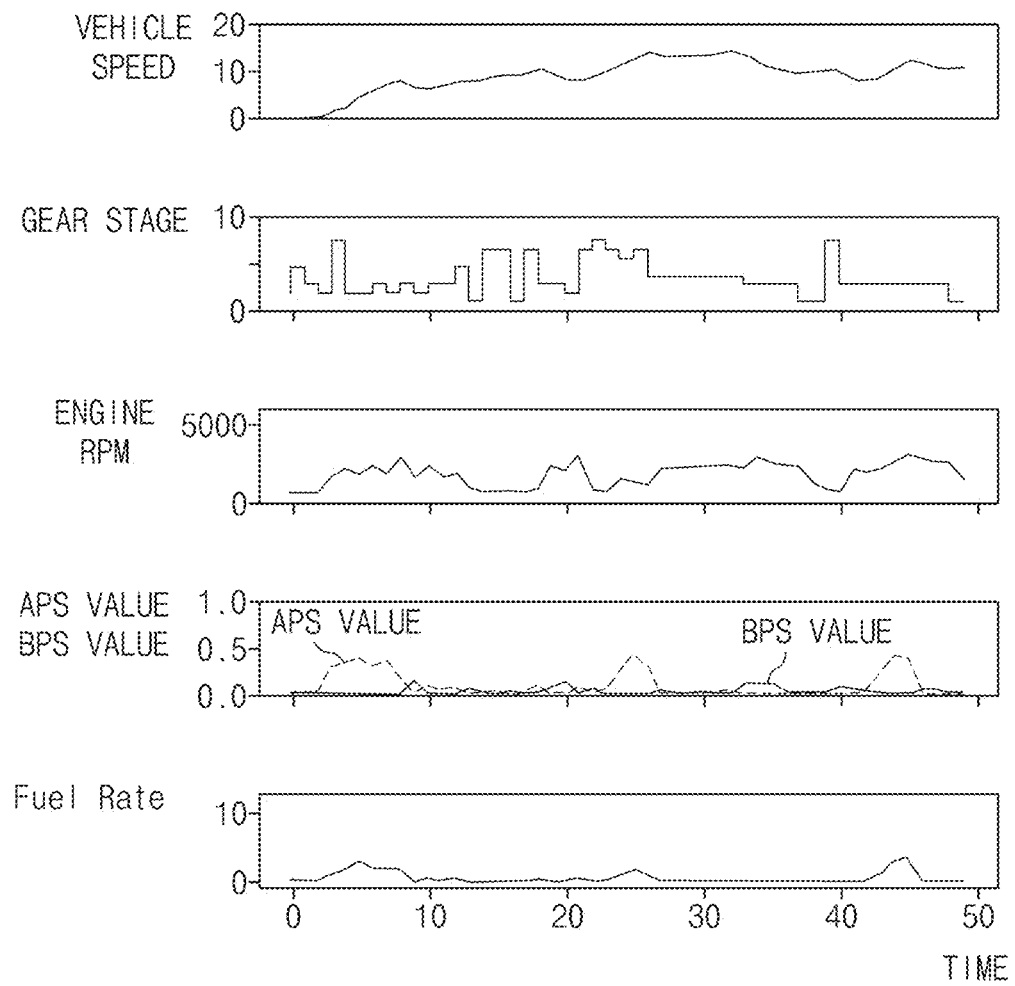
FIG. 4 is a different diagram illustrating a performance of a transmission control apparatus of a vehicle, according to an embodiment of the present disclosure.

FIG. 4 is a different diagram illustrating a performance of a transmission control apparatus of a vehicle, according to an embodiment of the present disclosure.

The graphs illustrated in FIG. 3 are graphs illustrating a performance of the agent 13 that has performed the reinforcement learning 196 times. The graphs illustrated in FIG. 4 are graphs illustrating a performance of the agent 13 that has performed the reinforcement learning 1837 times.

Although there is no significant difference between the vehicle speed illustrated in FIG. 3 and the vehicle speed illustrated in FIG. 4, it may be seen that the number of shifts in the gear stages illustrated in FIG. 3 is significantly greater than the number of shifts in the gear stages illustrated in FIG. 4.

In addition, it may be seen that the engine RPM illustrated in FIG. 3 is higher than the engine RPM illustrated in FIG. 4, the accumulative value of the engine RPM illustrated in FIG. 3 is greater than the accumulative value of the engine RPM illustrated in FIG. 4, and the deviation of the engine RPM illustrated in FIG. 3 is greater than the deviation of the engine RPM illustrated in FIG. 4.

In addition, it may be seen that the APS value illustrated in FIG. 3 is greater than the APS value illustrated in FIG. 4, the cumulative value of the APS value illustrated in FIG. 3 is greater than the cumulative value of the APS value illustrated in FIG. 4, and the deviation of the APS value illustrated in FIG. 3 is greater than the deviation of the APS value illustrated in FIG. 4. This means that, as the number of times reinforcement learning is performed increases, the amount of manipulation of the accelerator pedal by the driver decreases.

In addition, it may be seen that the BPS value illustrated in FIG. 3 is greater than the BPS value illustrated in FIG. 4, the cumulative value of the BPS value illustrated in FIG. 3 is greater than the cumulative value of the BPS value illustrated in FIG. 4, and the deviation of the BPS value illustrated in FIG. 3 is greater than the deviation of the BPS value illustrated in FIG. 4. This means that, as the number of times reinforcement learning is performed increases, the amount of brake pedal operation by the driver decreases.

In addition, it may be seen that the fuel consumption amount illustrated in FIG. 3 is greater than the fuel consumption amount illustrated in FIG. 4, the accumulative value of the fuel consumption amount illustrated in FIG. 3 is greater than the accumulative value of the fuel consumption amount illustrated in FIG. 4, and the deviation of the fuel consumption amount illustrated in FIG. 3 is greater than the deviation of the fuel consumption amount illustrated in FIG. 4.

Figure 5:
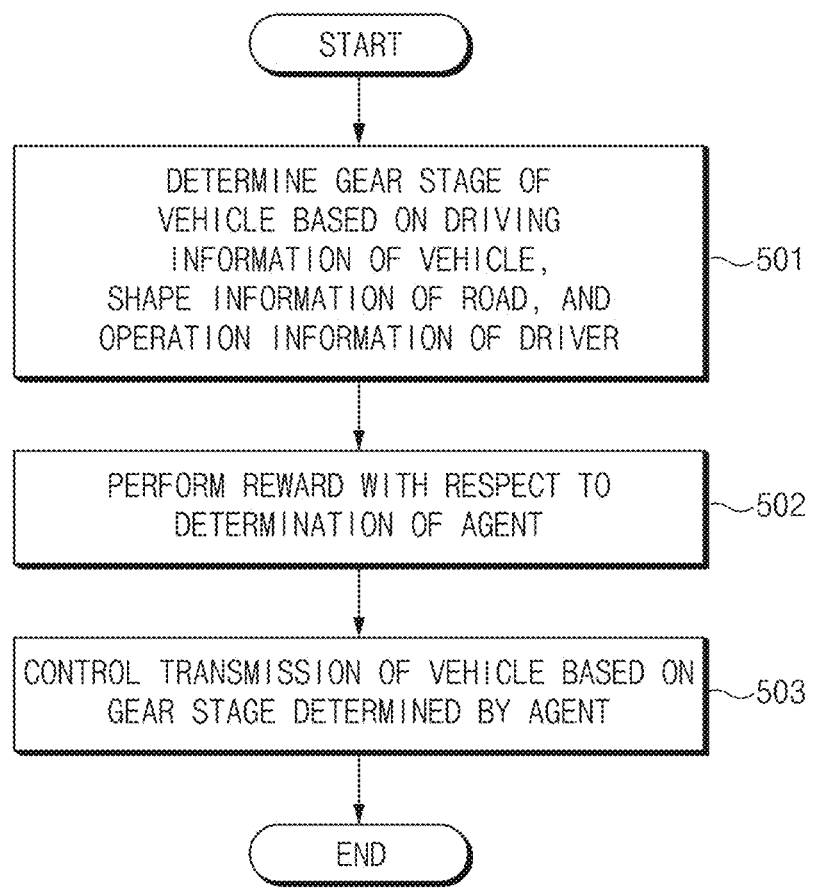
FIG. 5 is a flowchart illustrating a transmission control method of a vehicle, according to an embodiment of the present disclosure.

FIG. 5 is a flowchart illustrating a transmission control method of a vehicle, according to an embodiment of the present disclosure.

First, the agent 13 determines the gear stage of a vehicle based on the driving information of the vehicle, the shape information of a road, and the operation information of a driver (501).

Then, the controller 14 performs a reward with respect to the determination of the agent 13 (502).

Thereafter, the controller 14 controls the transmission of the vehicle based on the gear stage determined by the agent 13 (503).

Figure 6:
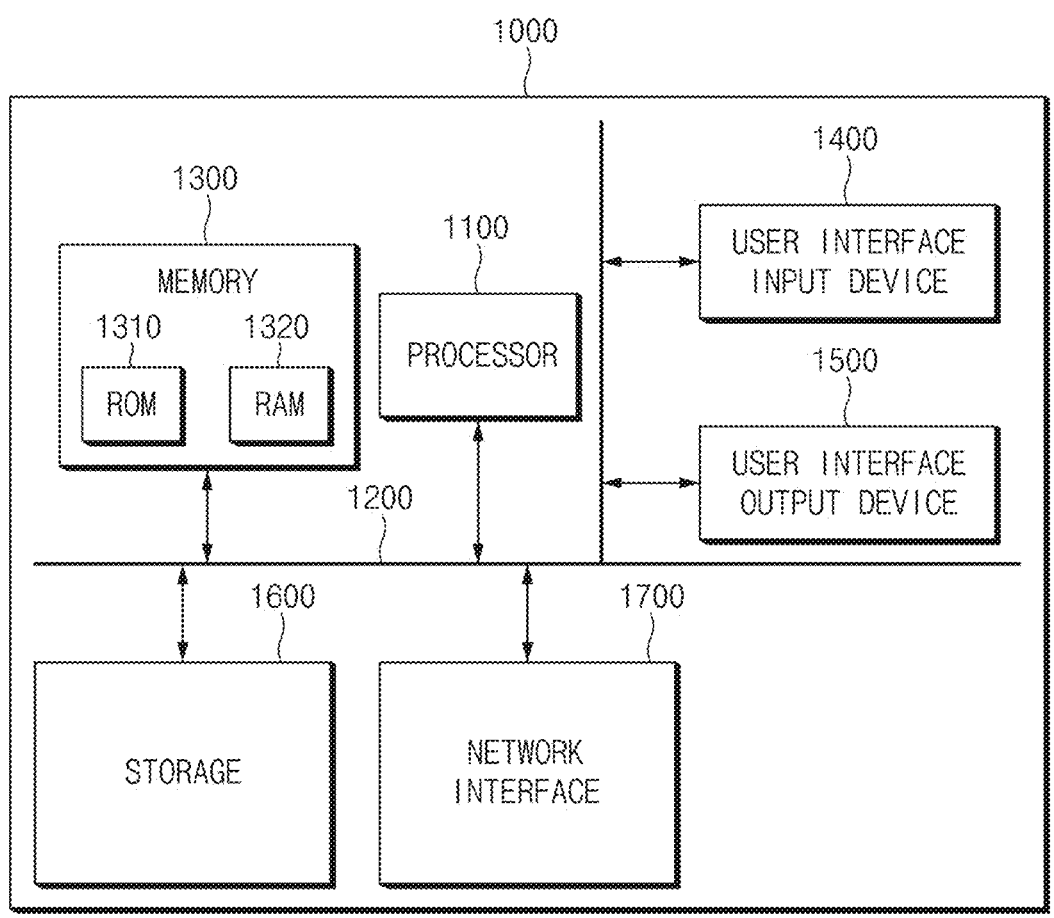
FIG. 6 is a block diagram illustrating a computing system for executing a transmission control method of a vehicle, according to an embodiment of the present disclosure.

FIG. 6 is a block diagram illustrating a computing system for executing a transmission control method of a vehicle, according to an embodiment of the present disclosure.

Referring to FIG. 6, a transmission control method of a vehicle according to an embodiment of the present disclosure may be implemented through a computing system. A computing system 1000 may include at least one processor 1100, a memory 1300, a user interface input device 1400, a user interface output device 1500, a storage 1600, and a network interface 1700. The computing system components are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

According to an embodiment of the present disclosure, a transmission control apparatus and method of a vehicle may determine an optimal gear stage in which both the driving environment of the vehicle and the road environment, as well as the driving tendency of a driver, are reflected. The transmission control apparatus and method may determine an optimal gear stage by performing reinforcement learning to give a reward with respect to the determination of an agent and controlling the transmission of the vehicle based on the gear stage determined by the agent. The agent determines the gear stage of the vehicle based on driving information of the vehicle, shape information of a road, and operation information of the driver.

The above description is merely illustrative of the technical idea of the present disclosure. Those of ordinary skill in the art to which the present disclosure pertains should be able to make various modifications and variations without departing from the essential characteristics of the present disclosure.

Therefore, embodiments of the present disclosure are not intended to limit the technical spirit of the present disclosure but instead are provided only for the illustrative purpose. The scope of protection of the present disclosure should be construed by the attached claims and all equivalents thereof should be construed as being included within the scope of the present disclosure.

What is claimed is:

1. An apparatus for controlling a transmission of a vehicle, the apparatus comprising:
    an agent configured to determine a gear stage of the vehicle based on driving information of the vehicle, shape information of a road, and operation information of a driver; and
    a controller configured to perform a reward with respect to the determination of the agent and to control the transmission of the vehicle based on the gear stage determined by the agent.

2. The apparatus of claim 1, wherein the agent performs reinforcement learning to receive a maximum reward from the controller.

3. The apparatus of claim 1, wherein the driving information of the vehicle includes at least one of a vehicle speed, an engine revolutions per minute (RPM), or a current gear stage,
    wherein the shape information of the road includes at least one of a slope of the road or a curvature of the road, and
    wherein the operation information of the driver includes at least one of an accelerator position sensor (APS) value or a brake position sensor (BPS) value.

4. The apparatus of claim 1, wherein the controller performs the reward with respect to the determination of the agent based on at least one of a fuel consumption amount, an APS value, a BPS value, or an engine RPM of the vehicle.

5. The apparatus of claim 1, wherein the controller determines a reward value with respect to at least one of a fuel consumption amount, an APS value, a BPS value, or an engine RPM of the vehicle, assigns different weights to the respective reward values, and determines a sum of the reward values to which the weights are applied as a final reward value.

6. The apparatus of claim 5, wherein the controller sets a lower reward value as the fuel consumption amount of the vehicle increases and sets a higher reward value as the fuel consumption amount decreases according to the gear stage determination of the agent.

7. The apparatus of claim 5, wherein the controller sets a higher reward value as an accumulative value of the APS value decreases and sets a lower reward value as the accumulative value of the APS value increases according to the gear stage determination of the agent.

8. The apparatus of claim 5, wherein the controller sets a higher reward value as an accumulative value of the BPS value decreases and sets a lower reward value as the accumulative value of the BPS value increases according to the gear stage determination of the agent.

9. The apparatus of claim 5, wherein the controller sets a higher reward value as an accumulative value of the engine RPM value decreases and sets a lower reward value as the accumulative value of the engine RPM value increases according to the gear stage determination of the agent.

10. A method of controlling transmission of a vehicle, the method comprising:
    determining, by an agent, a gear stage of the vehicle based on driving information of the vehicle, shape information of a road, and operation information of a driver;
    performing, by a controller, a reward with respect to the determination of the agent; and
    controlling, by the controller, the transmission of the vehicle based on the gear stage determined by the agent.

11. The method of claim 10, wherein the determining of the gear stage of the vehicle includes performing reinforcement learning to receive a maximum reward from the controller.

12. The method of claim 10, wherein the determining of the gear stage of the vehicle includes:
    obtaining at least one of a vehicle speed, an engine revolutions per minute (RPM) or a current gear stage, as driving information of the vehicle,
    obtaining at least one of a slope of the road or a curvature of the road, as the shape information of the road, and
    obtaining at least one of an accelerator position sensor (APS) value or a brake position sensor (BPS) value as the operation information of the driver.

13. The method of claim 10, wherein the performing the reward with respect to the determination of the agent includes performing the reward with respect to the determination of the agent based on at least one of a fuel consumption amount, an APS value, a BPS value, or an engine RPM of the vehicle.

14. The method of claim 10, wherein the performing the reward with respect to the determination of the agent includes:
    determining a reward value with respect to at least one of a fuel consumption amount, an APS value, a BPS value, or an engine RPM of the vehicle;
    assigning different weights to the respective reward values; and
    determining a sum of the reward values to which the weights are applied as a final reward value.

15. The method of claim 14, wherein the performing the reward with respect to the determination of the agent includes:
    setting a lower reward value as the fuel consumption amount of the vehicle increases according to the gear stage determination of the agent; and
    setting a higher reward value as the fuel consumption amount decreases.

16. The method of claim 14, wherein the performing the reward with respect to the determination of the agent includes:
    setting a higher reward value as an accumulative value of the APS value decreases according to the gear stage determination of the agent; and
    setting a lower reward value as the accumulative value of the APS value increases.

17. The method of claim 14, wherein the performing the reward with respect to the determination of the agent includes:
    setting a higher reward value as an accumulative value of the BPS value decreases according to the gear stage determination of the agent; and
    setting a lower reward value as the accumulative value of the BPS value increases.

18. The method of claim 14, wherein the performing the reward with respect to the determination of the agent includes:
    setting a higher reward value as an accumulative value of the engine RPM value decreases according to the gear stage determination of the agent; and setting a lower reward value as the accumulative value of the engine RPM value increases.

* * * * *